United States Patent [19]

Morris

[11] 3,976,627

[45] Aug. 24, 1976

[54] VULCANIZABLE COMPOSITIONS OF CARBOXYL-CONTAINING POLYMERS

[75] Inventor: Roger E. Morris, Cuyahoga Falls, Ohio

[73] Assignee: The B.F. Goodrich Company, Akron, Ohio

[22] Filed: Oct. 4, 1974

[21] Appl. No.: 512,126

[52] U.S. Cl. .................................. 526/14; 526/26; 526/42; 526/47; 526/49; 526/317; 526/328
[51] Int. Cl.² ...................................... C08F 220/06
[58] Field of Search ........... 260/78.5 BB, 80.8, 80.7, 260/94.7 HA, DIG. 31, 86.1 N

[56] References Cited
UNITED STATES PATENTS

| | | | |
|---|---|---|---|
| 2,478,036 | 8/1949 | Baum | 260/94.7 HA |
| 2,669,550 | 2/1954 | Brown | 260/80.7 |
| 2,710,292 | 6/1955 | Brown | 260/78.5 BU |
| 2,724,707 | 11/1955 | Brown | 260/82.1 |
| 2,849,426 | 8/1958 | Miller | 260/80.7 |
| 2,984,639 | 5/1961 | Stamberger | 260/78.5 T |
| 2,988,539 | 6/1961 | Cohen | 260/78.5 T |
| 3,078,254 | 2/1963 | Zelinski | 260/94.7 HA |
| 3,178,398 | 4/1965 | Strobel | 260/94.7 HA |
| 3,404,134 | 10/1968 | Rees | 260/80.8 |
| 3,471,460 | 10/1969 | Rees | 260/80.8 |

*Primary Examiner*—Paul R. Michl
*Attorney, Agent, or Firm*—Alan A. Csontos

[57] ABSTRACT

Carboxyl-containing polymers are cured using a cure system consisting essentially of (1) a di- or polyhalide, (2) a nitrogen-containing compound selected from the group consisting of secondary or tertiary amines, guanidines, and quaternary ammonium salts, and (3) an acid acceptor.

23 Claims, No Drawings

VULCANIZABLE COMPOSITIONS OF CARBOXYL-CONTAINING POLYMERS

BACKGROUND OF THE INVENTION

Polymers having carboxyl groups are known. These polymers can vary in nature from high molecular weight plastics and elastomers to low molecular weight liquids, and can have very low to very high weight percent carboxyl contents. The polymers are insolubilized by reacting them with crosslinking or cure agents to form vulcanized articles as films and coatings, caulks, or dimentionally stable molded products. Different types of materials are used as cross-linking or cure agents, the most common materials being metal salts or oxides (see U.S Pat. Nos. 2,604,668; 2,649,439; 2,669,550; 2,724,707; 2,726,230 and 3,404,134). The inventor has discovered a new and improved cure system for curing carboxyl-containing polymers.

SUMMARY OF THE INVENTION

Carboxyl-containing polymers are vulcanized using a cure system consisting essentially of (a) a di- or polyfunctional halide compound, (b) a nitrogen-containing compound, and (c) an acid acceptor. The halide compound is an aliphatic halide containing 2 to about 40 carbon atoms in the molecule and have at least two primary carbon halide groups thereon, said halide being chlorine, bromine or iodine. The nitrogen-containing compound is selected from the group consisting of (i) quaternary ammonium salts, (ii) a mono-, di- or polyfunctional tertiary amine or monofunctional secondary amine, or (iii) a quanidine. The acid acceptor is selected from the group consisting of (i) alkali and nonalkali metal salts of organic acids and (ii) nonalkali metal oxides and hydroxides. The composition of the carboxyl-containing polymer and the cure system readily cures upon heating to yield vulcanizates having good physical properties.

DETAILED DESCRIPTION OF THE INVENTION

Compositions comprising a carboxyl-containing polymer and, as a cure system (a) a di- or polyfunctional halide, (b) a nitrogen-containing compound, and (c) an acid acceptor, are readily vulcanized upon heating to yield vulcanizates having good physical properties.

The carboxyl-containing polymers employed are of three main types; i.e. those obtained by the polymerization of carboxyl-containing monomers, those obtained by hydrolyzing a polymer containing groups hydrolyzable to carboxyl groups, and those polymers containing carboxyl groups obtained by both methods. The range of weight percent carboxyl (COOH) content in these polymers is from about 0.05% to about 63% by weight (the high range exemplified by polyacrylic acid homopolymer).

The largest of the types of carboxyl-containing polymers are those obtained by polymerization of carboxyl-containing monomers. The polymers contain from about 0.1% to 100% by weight (i.e. homopolymers) of interpolymerized units of a carboxyl-containing monomer and up to 99.9% by weight of interpolymerized units of a copolymerizable vinylidene monomer. The carboxyl-containing monomer used to prepare the polymers can be any such monomer that can be polymerized. Normally, the carboxyl-containing monomer is a monomer having olefinic unsaturation and capable of being polymerized via a free-radical process. Of these, the $\alpha,\beta$-olefinically unsaturated carboxyl-containing monomers are most used. The monomer can be mono-, di-, or polycarboxylic, and can contain from 3 to about 8 carbon atoms in the molecule. Examples of the carboxyl-containing monomers are acrylic acid, methacrylic acid, ethacrylic acid, $\beta,\beta$-dimethyl acrylic acid, crotonic acid, 2-methyl-2-butenoic acid, 2-pentenoic acid, 2-hexenoic acid, 3-ethyl-2-pentenoic acid, 2-heptenoic acid, maleic acid, fumaric acid, citraconic acid, mesaconic acid, itaconic acid, 3-butene-1,2,3-tricarboxylic acid, 2-norbornene- 5-carboxylic acid, and the like. The more preferred monomers are acrylic acid, methacrylic acid, maleic acid, fumaric acid, and itaconic acid.

The carboxyl-containing monomers are often copolymerized with one or more noncarboxyl containing vinyl monomers having a terminal vinylidene ($CH_2=C<$) group. These monomers, used in up to 99.9% by weight, are acrylates and methacrylates, such as ethyl acrylate, n-butyl acrylate, octyl acrylate, dodecyl acrylate, methyl methacrylate, phenyl acrylate, cyclohexyl acrylate, and the like; vinyl and allyl esters such as vinyl acetate, vinyl propionate, vinyl butyrate, allyl acetate, and the like; vinyl ketones such as methyl vinyl ketone, propyl vinyl ketone, and the like; vinyl and allyl ethers such as vinyl methyl ether, vinyl ethyl ether, vinyl isobutyl ether, allyl methyl ether, and the like; vinyl aromatics such as styrene, $\alpha$-methylstyrene, vinyl toluene, vinyl naphthalene, and the like; dienes such as butadiene, isoprene, 2-isopropyl-1,3-butadiene, and the like; $\alpha$-monoolefins such as ethylene, propylene, 1-butene, 1-hexene, and the like; divinyls such as divinyl benzene, divinyl ether, diethylene glycol diacrylate, and the like; hydroxyl containing vinyl monomers such as allyl alcohol, $\beta$-hydroxyethyl acrylate, $\alpha$-hydroxypropyl acrylate, 4-hydroxybutyl acrylate, $\beta$-hydroxyethyl methacrylate; and the like. Often mixtures of two or more types of monomers are employed.

One of the most preferred copolymerizable vinylidene monomers to be used with the carboxyl-containing monomers is an acrylate monomer of the formula

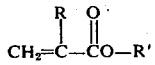

wherein R is H, $-CH_3$ or $-C_2H_5$, and R' is an alkyl radical containing 1 to about 24 carbon atoms or an alkoxyalkyl radical containing a total of 2 to about 12 carbon atoms total in the radical. The alkyl structure can be linear or branched. Examples of the acrylates are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethyl- hexyl acrylate, n-decyl acrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, and the like. Often mixtures of two or more types of acrylate monomers are employed.

More preferredly, R' is an alkyl radical containing 1 to about 18 carbon atoms or an alkoxyalkyl radical containing 3 to about 8 carbon atoms. Examples of the more preferred monomers are ethyl acrylate, n-propyl acrylate, isopropyl acrylate, n-butyl acrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Especially good results are obtained when employing ethyl acrylate, n-butyl acrylate, 2-ethylhexyl acrylate, methoxyethyl acrylate, or mixtures of the same.

Examples of the carboxyl-containing polymers of the first type, i.e. those obtained by polymerizing carboxyl-containing monomers, are polyacrylic acid, polymethacrylic acid, poly(ethyl acrylate/acrylic acid), poly(ethyl acrylate/itaconic acid), poly(ethyl acrylate/n-butyl acrylate/acrylic or methacrylic acid), poly(ethyl acrylate/methoxyethyl acrylate/acrylic or methacrylic acid), poly(ethyl acrylate/n-butyl acrylate/methoxyethyl acrylate/methacrylic acid), poly(ethyl acrylate/citraconic acid), poly(n-butyl acrylate/maleic acid), poly(n-butyl acrylate/styrene/methacrylic acid, poly(ethyl acrylate/methoxyethyl acrylate/ethyl vinyl ether/acrylic or methacrylic acid), poly(butadiene/acrylic or methacrylic acid), poly(isoprene/fumaric acid), poly(butadiene/styrene/acrylic or methacrylic acid), poly(ethylene/acrylic acid), and the like.

The second type of carboxyl-containing polymers are those obtained by hydrolyzing a polymer containing groups hydrolyzable to carboxyl groups. Groups hydrolyzable to carboxyl groups include acid anhydrides, amides, nitrile, acid chlorides, and β-cyanoalkyl groups. Polymers can be prepared containing the above-mentioned hydrolyzable groups by interpolymerization of monomers having these groups, alone or with other copolymerizable monomers as described above. Examples of hydrolyzable monomers are maleic anhydride, citraconic anhydride, 2-norbornene-5,6-anhydride, and the like; acrylamide, methacrylamide, and the like; acrylonitrile, methacrylonitrile, and the like; acrylyl chloride, methacrylyl chloride, and the like; and β-cyanoethyl acrylate, β-cyanoethyl methacrylate, β-cyanopropyl acrylate, and the like. U.S. Pat. No. 2,649,439 discloses procedures and techniques on hydrolysis of these groups.

The hydrolyzable monomers can be polymerized alone (i.e. homopolymers), with each other as copolymers, or with other copolymerizable monomers. Hence, the interpolymerized unit weight of such hydrolyzable monomers in the polymer can be from 100% by weight to as low as 0.1% by weight, with up to 99.9% by weight of interpolymerized units of a copolymerizable vinyl monomer having a terminal vinylidene group. The potential carboxyl content of these polymers is the same as the carboxyl content of the carboxyl-containing polymers, i.e. from about 0.05% to about 63% by weight of the polymer.

Examples of polymers containing hydrolyzable groups are polyacrylamide, polymethacrylamide, polyacrylonitrile, poly(ethyl acrylate/acrylamide or methacrylamide), poly(ethyl acrylate/n-butyl acrylate/acrylamide or methacrylamide), poly(ethyl acrylate/maleic anhydride), poly(ethyl acrylate/β-cyanoethyl acrylate), poly(ethyl acrylate/n-butyl acrylate/acrylonitrile or methacrylonitrile), poly(ethyl acrylate/acrylyl chloride), poly(butadiene/acrylamide or methacrylamide), poly(isoprene/maleic anhydride), poly(butadiene/acrylonitrile or methacrylonitrile), poly(butadiene/styrene/acrylonitrile), poly(ethylene/maleic or citraconic anhydride), and the like.

As a third type of useful polymer, the polymer can contain carboxyl groups from both interpolymerization of carboxyl-containing monomers and hydrolysis of hydrolyzable monomers. Of course, if the polymer already contains carboxyl groups (for example, as by interpolymerization of carboxyl-containing monomers), the hydrolyzable groups need not be hydrolyzed to carboxyl groups.

Examples of polymer having both carboxyl groups and hydrolyzable groups are poly(n-butyl acrylate/acrylonitrile/acrylic or methacrylic acid), poly(ethyl acrylate/n-butyl acrylate/maleic anhydride/methacrylic acid), poly(n-butyl acrylate/acrylic acid/acrylamide or methacrylamide), poly (ethyl acrylate/itaconic acid/β-methacrylamide), poly (n-butyl acrylate/ethyl vinyl ether/acrylonitrile/methacrylic acid), poly(butadiene/acrylonitrile/acrylic or methacrylic acid), poly(butadiene/fumaric acid/acrylamide), and the like.

CURE SYSTEM

The carboxyl-containing polymers, used at 100 parts by weight, are vulcanized using a cure system consisting essentially of (a) from about 0.1 part to about 10 parts by weight of a di- or polyfunctional halide containing 2 to about 40 carbon atoms in the molecule, and having at least two primary carbon halide groups thereon, (b) from about 0.1 part to about 10 parts by weight of a nitrogen-containing compound selected from the group consisting of (i) a quaternary ammonium salt, (ii) a mono-, di-, or polyfunctional tertiary amine or monofunctional secondary amine, or (iii) a guanidine, and (c) from about 0.1 part to about 15 parts by weight of an acid acceptor. Use of over 15 parts by weight of acid acceptor is not necessary to achieve good cures. More preferredly, the di- or polyfunctional halide is used at from about 0.5 part to about 5 parts by weight; the quaternary ammonium salt, amine or guanidine is used at from 0.1 part to about 5 parts by weight; and the acid acceptor is used at from about 0.3 part to about 10 parts by weight, per 100 parts by weight of polymer.

DI- OR POLYFUNCTIONAL HALIDES

The di- or polyfunctional halide is an aliphatic halide containing 2 to about 40 carbon atoms in the molecule and having at least two primary carbon halide groups thereon. The halide group is selected from the group consisting of chlorine, bromine, and iodine, with chlorine being the preferred halide. The halide structure can be postulated as

where X is Cl, Br, or I, $n$ is at least 2 to about 6 or more, and A is nothing or an aliphatic group such as an alkylene radical of 1 to about 24 carbon atoms; an ether, ketonic, or ester bivalent radical containing 2 to about 24 carbon atoms total in the bivalent radical; or an aryl bivalent radical including diaryl, dialkaryl, and naphthenic bivalent radicals where the total carbon atoms are from 6 to about 14.

Examples of the di- or polyfunctional halides are alkylene dihalides such as ethylene dibromide, 1,3-propylidene dichloride, 1,3-chlorotrimethylene bromide, 1,4-dibromobutane, 1,4-diiodobutane, 1,6- dichlorohexane, 1,5-dibromo-3-methyl pentane, 1,6-diiodohexane, 1,8-dibromooctane, 1,9-dichlorononane, 1,14-dichloro(tetradecane), and the like; difunctional alkarylenes such as bis-β-(chloroethyl)benzene, bis-β-(bromoethyl)benzene, 2,5-bis(chloromethyl)p-xylene, bis(chloromethyl) mesitylene, bis(chloromethyl)durene, β,β-bis(chloroethyl)-p,p-diphenyl methane, and the like; dihaloethers such as β,β'-dichlorodiethyl ether, β,β'-dibromodiethyl ether, β-chloroethyl-3-chloropropyl ether, 4,4'-dichlorodibutyl ether, bis-(chloromethyl)diphenyl ether, and the like; dihaloketones such as α,α'-dichloroacetone, α,α'-dichlorodiacetyl, 1-bromo-5-chloro-2-pentanone, di-β-chloroethyl ketone, and the like; and dihaloesters such as β-bromoethyl chloroacetate, bis-(chloroethyl)succinate, and the like.

QUATERNARY AMMONIUM SALT

The quaternary ammonium salts are ammonium salts in which all four hydrogen atoms have been replaced with organic radicals. The quaternary ammonium salts include the structure

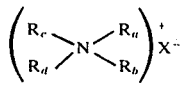

wherein $R_a$, $R_b$, $R_c$ and $R_d$ are hydrocarbon radicals containing 1 to about 18 carbon atoms such as alkyl, aryl, alkaryl and aralkyl radicals, or wherein two or three of the $R_a$, $R_b$, $R_c$ and $R_d$ radicals form with the nitrogen atom a heterocyclic structure containing 3 to 8 atoms selected from the group consisting of C, N, O and S, where at least two atoms are C; and X is an anion from an inorganic or organic acid wherein the acidic hydrogen is attached to halogen or oxygen. More preferredly, X is an anion such as $Cl^-$, $Br^-$, $I^-$, $NO_3^-$, $HSO_4^-$, $NaSO_4^-$, $H_2PO_4^-$, $NaHPO_4^-$, $RCOO^-$, $ROSO_3^-$, $RSO_3^-$, $H_2BO_3^-$, and $ROPO_3H^-$, and R is an aliphatic, alkyl or alkaryl radical containing 1 to 18 carbon atoms. The aliphatic radical can contain ether, thioether, and/or ester structures. For example, it can be the reaction product of an organic acid or alcohol with ethylene oxide, such as an alkylphenoxy poly (ethyleneoxy)ethyl structure.

Examples of the quaternary ammonium salts are tetramethyl ammonium chloride, tetramethyl ammonium bromide, trimethyl ethyl ammonium iodide, trimethyl soya ammonium chloride, trimethyl cetyl ammonium bromide, trimethyl soya ammoniun neodecanoate, trimethyl soya ammonium trimethylhexanoate, trimethyl benzyl ammonium benzoate, trimethyl benzyl ammonium chloride, trimethyl benzyl ammonium paratoluene sulfonate, trimethyl soya ammonium alkylbenzene sulfonate, dimethyl ethyl cetyl ammonium chloride, dimethyl octyl benzyl ammonium chloride, dimethyl oleyl benzyl ammonium chloride, dimethyl octadecyl benzyl ammonium chloride, dimethyl phenyl benzyl ammonium bromide, dimethyl dibenzyl ammonium bromide, methyl ethyl propyl isobutyl ammonium chloride, (tetradecyl) trimethyl ammonium chloride, methyl cetyl dibenzyl ammonium bromide, cetyl pyridinium chloride, dodecyl pyridinium bromide, lauryl pyridinium sulfate, trimethyl benzyl ammonium borate, trimethyl benzyl ammonium hydrogen phosphate, trimethyl soya ammonium alkylphenoxy poly(ethyleneoxy)ethyl phosphate, and the like.

SECONDARY AND TERTIARY AMINES

The secondary and tertiary amines can be used in their natural form or as amine precursors, as amine/acid salts, or as amine/isocyanate reaction products. Of course, the tertiary amines can be added only in their natural state, as tertiary amine precursors, or as an amine/acid salt.

The amine precursors, amine/acid salts and amine/isocyanate reaction products are added at levels which yield the desired level of amine catalyst. For example, if the amine forms forty percent by weight of the compound, and 1 part by weight of the amine is desired, 2.5 parts by weight of the compound would be added to the carboxyl-containing polymer.

The tertiary amines can be mono-, di-, or poly-functional aliphatic amines, cyclic methyleneamines, or heterocyclic amines. Examples of such amines are trimethyl amine, triethyl amine, dimethylbutyl amine, N,N,N',N'-tetramethyl ethylenediamine, triethylene diamine, dimethylbenzyl amine, methyl dibenzyl amine, dimethyl ethanol amine, methyl diethanol amine, N-methyl piperidine, N,N-dimethyl (aminoethyl)piperidine, N-methyl morpholine, quinuclidine, N,N'-dimethylpiperazine, pyridine, 3-ethyl-4-methyl pyridine, 3-phenylpropylpyridine, and the like. The more preferred tertiary amines are the monofunctional cyclic methyleneamines and heterocyclic amines containing 4 to 8 atoms in the ring, and the monofunctional tertiary aliphatic amines containing 1 to about 18 carbon atoms in the aliphatic groups, provided that at least one aliphatic group is a methyl or ethyl radical.

The tertiary amines can be employed as amine/acid adducts. In this form, increased scorch safety can be obtained. The acids can be inorganic or organic acids. Examples of the acids are hydrochloric acid, phosphoric acid, lauryl sulfonic acid, benzene sulfonic acid, paratoluene sulfonic acid, alkylbenzene sulfonic acids, aromatic carboxylic acids such as benzoic acid, and aliphatic carboxylic acids such as acetic acid, propionic acid, butyric acid, hexanoic acid, 2-ethylhexanoic acid, dodecanoic acid, octadecanoic acid, naphthenic acid, and the like. When used in the amine/acid form, the strong tertiary aliphatic amines such as trimethylamine and triethylamine can be conveniently employed. Examples of tertiary amine/acid adducts are trimethylamine/hydrochloric acid adduct, trimethylamine/phosphoric acid adduct, trimethylamine/sodium hydrogen sulfate adduct, trimethylamine/benzoic acid adduct, triethylamine/butyric acid adduct, triethylamine/dodecanoic acid adduct, triethylamine/benzene sulfonic acid adduct, N-methyl piperidine/lauryl sulfonic acid adduct, N-methyl piperidine/benzoic acid adduct, N-methyl piperidine/2-ethylhexanoic acid adduct, quinuclidine/hydrochloric acid adduct, 3-phenylpropylpyridine benzoic acid adduct, and the like. If an amine/acid adduct is used, an acid absorber should be present in sufficient quantity to neutralize the released acid.

The tertiary amines can also be employed as tertiary amine precursors. Aminimides break down at vulcanization temperatures to release a tertiary amine. Used in the comositions of this invention, the aminimides allow for greater scorch safety and yet a fast cure. Examples of these compounds are bis(trimethylamine)sebacimide, bis(dimethyl-2-hydroxypropylamine)adipimide, dimethyl-2-hydroxypropylamine laurimide, and dimethyl-2-hydroxypropylamine stearimide.

The secondary amines are monofunctional aliphatic amines, cyclic methyleneamines, or heterocyclic amines. Examples of such amines are dimethylamine, diethylamine, diisopropyl amine, dioctyl amine, dilauryl amine, dibenzyl amine, methylbenzyl amine, methylethanol amine, diethanol amine, imidazole, pyrrolidine, piperidine, morpholine, and the like.

The secondary amine/acid salts are prepared by the reaction of the amine with a halogen acid, a phosphoric acid, or partial phosphoric acid ester, partial ester of a sulfuric acid, or a carboxylic acid, and partial salts of the acids such as sodium hydrogen sulfate. Examples of such acids are hydrochloric acid, hydrobromic acid, phosphoric acid, octadecyl dihydrogen phosphate, dioctyl hydrogen phosphate, lauryl hydrogen sulfate, and monocarboxylic acids such as aliphatic acids, especially the fatty acids, and aromatic acids. Examples of the monocarboxylic acids are acetic acid, propionic acid, butanoic acid, hexanoic acid, octanoic acid, 2-ethyl hexanoic acid, dodecanoic acid, hexadecanoic acid, octadecanoic acid, hydroxy acetic acid, acetoacetic acid, benzoic acid, salicyclic acid, and the like.

More preferredly, the acids are halogen acids or monocarboxylic fatty acids or aromatic acids. Examples of such monofuctional secondary amine/acid salts are dioctyl amine hydrobromide, dilauryl amine stearate, diethanol amine benzoate, piperidine hydrochloride, diamethyl amine benzoate, piperidine benzoate, and the like.

The secondary amines can also be added as amine/isocyanate reaction products. The isocyanates can be mono-, di-, or polyisocyanates. Examples of the isocyanates are hexyl isocyanate, lauryl isocyanate, octadecyl isocyanate, phenyl isocyanate, p-chlorophenyl isocyanate, 3,4-dichlorophenyl isocyanate, 2,4- and 2,6-toluene diisocyanate, p-phenylene diisocyanate, bitolyl diisocyanate, diphenylmethane-p,p-diisocyanate, diphenylmethane triisocyanate, and the like. The more preferred isocyanates are the aromatic isocyanates.

Examples of secondary amine/isocyanate combinations are dioctylamine-octadecyl isocyanate, dibenzylamine-hexyl isocyanate, morpholine-phenyl isocyanate, dimethylamine-p-chlorophenyl isocyanate, diethylamine-toluene diisocyanate, dibutyl amine-diphenylmethane diisocyanate, piperidinetoluene diisocyanate, pyrrolidine-diphenylmethane-p,p'-diisocyanate, and the like.

GUANIDINES

Examples of the guanidines are guanidine, tetramethyl guanidine, dibutyl guanidine, diorthotolyl guanidine, dicyandiamide, and the like, and reaction products of guanidines with acyl chlorides, examples being 1,1,3,3-tetramethyl-2-acetyl guanidine, and 1,1,3,3-tetramethyl-2-benzyl guanidine, or with isocyanates, examples being tetramethyl guanidine/toluene diisocyanate adduct and diphenyl guanidine/phenyl isocyanate adduct.

ACID ACCEPTOR

The acid acceptors include metal oxy compounds such as alkali and non-alkali metal salts of organic acids such as carboxylic or organophosphoric acids and non-alkali metal oxides and hydroxides.

The metals in these halide ion acceptors are alkali metals such as sodium, potassium, lithium, and the like, or non-alkali metals which include alkaline earth metals such as barium, calcium and magnesium, and polyvalent metals such as lead, copper and cadmium.

The carboxylic acid is a monocarboxylic acid containing from 2 to about 24 carbon atoms. The acids may be unsaturated, and can contain hydroxy, ether, ester, or ketonic groups. Examples of such acids are acetic acid, propionic acid, isopropionic acid, valeric acid, caproic acid, octanoic acid, 2-ethyl hexanoic acid, decanoic acid, lauric acid, palmitic acid, stearic acid, cyclohexane carboxylic acid, crotonic acid, cinnamic acid, hydroxy acetic acid, acetoacetic acid, butoxy acetic acid, levulinic acid, mono-2-octyl maleate, benzoic acid, toluic acid, salicyclic acid, naphthenic acid, and the like. Preferredly, the metal salt is a salt of a saturated alkyl or of an aromatic monocarboxylic acid containing 6 to about 20 carbon atoms.

Examples of metal salts of carboxylic acids are sodium octanoate, potassium 2-ethyl hexanoate, sodium t-dodecanoate, sodium and potassium tetradodecanoate, sodium and potassium stearate, lithium eicosonate, sodium benzoate, potassium naphthenate, and the like; barium dihexanoate, magnesium dilaurate, barium distearate, and the like; and lead dioctanoate, barium di(2-ethylhexanoate), cadmium di(decanoate), lead dilaurate, cadmium distearate, magnesium dibenzoate, cupric naphthenate, and the like.

The metal salts of organo-phosphoric acids also may be used. These compounds are characterized by the structure

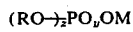

wherein M is an alkali metal, $y = 1$ or 2, $z = 1$ or 2, and $y + z = 3$, and R is an alkyl radical containing 1 to 24 carbon atoms, an aryl radical containing 6 to 24 carbon atoms, or a polyether as the condensation product of an organic acid or alcohol with ethylene oxide, such as alkylphenoxy poly(ethyleneoxy)ethyl groups.

Examples of these compounds are sodium salt of monophenyl phosphate, sodium salt of mono-p-tert-butyl phenyl phosphate, potassium salt of di-o-xenyl phosphate, sodium salt of mono-lauryl phosphate, sodium salt of dioctyl phosphate, potassium salt of distearyl phosphate, potassium salt of mono-dodecyl-monobenzyl phosphate, and sodium and potassium salts of mono- and di-alkylphenoxy poly(ethyleneoxy) ethyl phosphates, and the like. More preferredly, M is sodium or potassium and R, when an alkyl radical, contains about 8 to about 18 carbon atoms, and when an aryl radical contains 6 to about 14 carbon atoms.

The non-alkali metal oxy compounds include oxides and hydroxides of multivalent barium (Ba), lead (Pb), calcium (Ca), magnesium (Mg), copper (Cu), and cadmium (Cd). The more preferred non-alkali metal oxy compounds are the oxides and hydroxides of barium, lead, calcium, and magnesium. Examples of these compounds are barium oxide, barium hydroxide, lead monoxide, lead dioxide, red lead oxide, lead sesquioxide, lead hydroxide, calcium oxide, calcium hydroxide, magnesium oxide, magnesium hydroxide, cupric oxide, cupric hydroxide, cadmium oxide, and cadmium hydroxide.

The cure system can be admixed with the carboxyl-containing polymer using internal mixing kettles when the carboxyl-containing polymer is in solution, suspension, or latex form, and banburys, extruder mixers, two-roll mills when the polymer is in solid form, and other known mixing machines. Standard mixing procedures and techniques are used.

The polymers can be admixed with many other compounding ingredients. Examples of such ingredients are fillers such as the carbon blacks, calcium sulfates, aluminum silicates, phenol-formaldehyde and polystyrene resins, asbestos, cotton fibers, and the like; plasticizers and extenders such as dialkyl and diaryl organic esters like diisobutyl, diisooctyl, and dibenzyl sebacates, azelates, phthalates, and the like; petroleum oils, castor oil, tall oil, and the like; antioxidants, and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris(3-di-t-butyl-4-hydroxybenzyl)isocyanurate, tetrakis-methylene-3(3',-5'-di-t-tbutyl-4'-hydroxyphenyl) propionate methane, distearyl thiodipropionate, tri(nonylatedphenyl)-phosphite, and the like, and other ingredients such as pigments, tackifiers, flame retardants, fungicides, and the like.

The novel compositions are cured at temperatures from 125°F. for films and coatings and 250°F. for elastomers to about 450°F., whereas a more preferred range for elastomers is from about 275°F. to about 400°F. Cure time varies inversely as temperature, and ranges from about 30 seconds to about 60 minutes or more. The solid polymers can be postcured for about 3 to 24 hours at a temperature from about 300°F. to about 375°F.

The novel compositions develop rapid and stable cures. The elastomeric vulcanizates were evaluated as to their plied disk compression set (ASTM D395V), tensile and elongation (ASTM D412), and hardness (ASTM D676-Durometer A). Cure times were determined following ASTM D1646, using a Mooney Viscometer with a large rotor, or using a Monsanto Rheometer or a B.F.G. Cone Curometer, as described in U.S. Pat. No. 3,494,172.

The vulcanizates are useful in many applications such as under-the-hood automotive parts such as gaskets, seals, packings, belting and hosing, and out-of-doors applications such as weatherstripping, sealants, hosing and protective films and coatings.

The following examples serve to more fully illustrate the invention.

EXAMPLES

Polymers having carboxyl groups or groups hydrolyzable to carboxyl groups were admixed with compounding ingredients using a two-roll mill or a banbury internal mixer following standard mixing procedures. The cure system ingredients were mixed in using a two-roll mill. The composition was sheeted off, formed into mold and cured to provide vulcanizate samples for testing. Original and post cured tensile, elongation, hardness, and compression set data was obtained.

EXAMPLE I

Two carboxyl-containing acrylate rubbers were cured using cure systems of the present invention. The recipes of the compositions (in parts by weight) and vulcanizate property obtained are as follows:

|  | 1 | 2 | 3 |
| --- | --- | --- | --- |
| Rubber A[a] | 100 | — | — |
| Rubber B[b] | — | 100 | 100 |
| N550 Black | 55 | 55 | 55 |
| N881 Black | 20 | 20 | 20 |
| Acrawax C[c] | 1 | 2 | 2 |
| TE-80[c] | 1 | — | — |
| Sodium Stearate | 3.5 | — | — |
| Potassium Stearate | — | 2.8 | 2.7 |
| Trimethyl amine/phosphoric Acid Adduct | 1.3 | — | — |
| Bis(trimethylamine) sebacimide | — | — | 1.0 |
| Trimethyl soya[d] ammonium chloride[e] | — | 2.5 | — |
| 1,4-bis(chloromethyl)-2,3,5,6-tetramethyl-benzene | 1.1 | — | — |
| Bis($\Delta$-chlorobutyl)ether | — | 1.1 | — |
| Bis(chloromethyl)diphenyl ether | — | — | 1.3 |
| Press-Cured (40 Min. at 310°F.) |  |  |  |
| Tensile, psi | 1050 | — | — |
| Elongation, percent | 420 | — | — |
| Hardness, Durometer A | 51 | — | — |
| Compression set, percent (70 hrs. at 300°F.) | 74 | — | — |
| Post-Cured (8 hrs. at 350°F. after a press cure of 10 min. at 350°F.) |  |  |  |
| Tensile, psi | — | 1250 | 1580 |
| Elongation, percent | — | 360 | 250 |
| Hardness, Durometer A | — | 72 | 74 |

[a]75% n-butyl acrylate, 24.2% ethyl acrylate, 0.8% methacrylic acid
[b]99.2% ethyl acrylate, 0.8% methacrylic acid
[c]processing aids
[d]mixture of $C_{14}$—$C_{18}$ hydrocarbons from soya bean oil
[e]50% by weight on precipitated silica

EXAMPLE II

The cure system of the present invention consists essentially of the di- or poly halide compound, the nitrogen-containing compound, and the acid acceptor. The nitrogen-containing compound includes amines, guanidines, and quaternary ammonium salts known to the art. The acid acceptor includes metal oxides and salts known to the art. However, it is the combination of the three types of materials which yields the improved cure system of the invention. U.S. Pat. No. 2,649,439 shows the cure of acrylate rubbers containing carboxyl groups using polyvalent metal oxides as curatives, and suggests the presence of amines or quaternary ammonium salts. A comparison of cure systems suggested by the patent and cure systems of the present invention (containing the di- or poly halide compound) was run. The compositions were prepared according to the following recipes and the vulcanizate property data is presented.

Samples 1, 2 and 3 are compositions of the present invention. Samples 4 and 5 are compositions suggested by U.S. Pat. No. 2,649,439. The data shows that the compositions of the present invention yield significantly better vulcanizate properties. A comparison of sample 3 with sample 4 shows the advantages and improvement obtained by including a dihalide compound in the cure system.

EXAMPLE III

Various compositions of the present invention were prepared and cured. The recipes and data obtained follow.

|  | 1 | 2 | 3 | 4 | 5 |
|---|---|---|---|---|---|
| Acrylate rubber[a] | 100 | 100 | 100 | 100 | 100 |
| N550 black | 65 | 65 | 65 | 65 | 65 |
| Acrawax C | 2 | 2 | 2 | 2 | 2 |
| Sodium stearate | 3.5 | 3.5 | — | — | — |
| Barium oxide | — | — | 2.0 | 2.0 | 2.0 |
| Bis(trimethylamine)sebacimide | — | 0.8 | 0.8 | 0.8 | — |
| Trimethyl soya ammonium chloride[b] | — | — | — | — | 0.5 |
| Triethylenediamine | 0.5 | — | — | — | — |
| 1,4-bis(chloromethyl)-2,3,5,6-tetramethylbenzene | 0.8 | 0.8 | 0.8 | — | — |
| Cured 20 Min. at 350°F. | | | | | |
| 100% modulus, psi | 220 | 200 | 380 | — | — |
| Tensile, psi | 1130 | 1050 | 1350 | 150 | no |
| Elongation, percent | 570 | 550 | 320 | 530 | cure |
| Hardness, Durometer A | 63 | 65 | 67 | 50 | 53 |
| Post-cured 8 hrs. at 350°F. | | | | | |
| 100% modulus, psi | 450 | 350 | 610 | 280 | 170 |
| Tensile, psi | 1630 | 1610 | 1650 | 710 | 550 |
| Elongation, percent | 320 | 300 | 210 | 230 | 400 |
| Hardness, Durometer A | 67 | 69 | 74 | 53 | 53 |
| Compression set, percent (70 hrs. at 300°F.) | | | | | |
| Press cured | 92 | 87 | 76 | 111 | 113 |
| Post cured | 79 | 48 | 21 | 98 | 101 |

[a] 99.3 percent ethyl acrylate, 0.7% methacrylic acid
[b] 50% by weight on precipitated silica

|  | 1 | 2 | 3 | 4 | 5 | 6 |
|---|---|---|---|---|---|---|
| Rubber B[a] | 100 | 100 | — | — | — | — |
| Rubber C[b] | — | — | 100 | 100 | 100 | 100 |
| N550 Black | 65 | 65 | 65 | 65 | 65 | 65 |
| Acrawax C | 1 | 1 | 1 | 1 | 1 | 1 |
| TE-80 | 1 | 1 | 1 | 1 | 1 | 1 |
| Sodium Stearate | 1.3 | 1.3 | 1.3 | — | — | 2.5 |
| Potassium Stearate | — | — | — | — | 1.1 | — |
| Sodium Neodecanoate | — | — | — | 0.8 | — | — |
| Trimethyl soya ammonium para toluene sulfonate | 2.0 | 2.5 | 2.5 | 2.0 | — | — |
| Trimethyl soya ammonium neodecanoate | — | — | — | — | 2.0 | — |
| Benzyl trimethyl ammonium stearate | — | — | — | — | — | 1.2 |
| 1,4-bis(chloromethyl)-2,3,5,6-tetramethyl benzene | 1.1 | 1.1 | 1.1 | 1.1 | 1.1 | — |
| 1,2-bis(chloroethoxy)ethane | — | — | — | — | — | 0.6 |
| Press Cure | | | | | | |
| Temperature, °F. | 350 | 350 | 350 | 350 | 320 | 338 |
| Time, minutes | 10 | 10 | 10 | 10 | 30 | 30 |
| 100% Modulus, psi | 210 | 270 | 250 | 300 | 370 | — |
| Tensile, psi | 750 | 1150 | 1200 | 1300 | 1800 | — |
| Elongation, percent | 500 | 340 | 330 | 286 | 300 | — |
| Hardness, Durometer A | 61 | 61 | 60 | 60 | 59 | — |
| Post Cure | | | | | | |
| Hours at 300°F. | 20 | 20 | 20 | — | 20 | 8 |
| 100% Modulus, psi | 400 | 380 | 410 | — | 400 | 80 |
| Tensile, psi | 950 | 1180 | 1480 | — | 1850 | 1190 |
| Elongation, percent | 400 | 300 | 290 | — | 330 | 530 |
| Hardness, Durometer A | 66 | 67 | 67 | — | 63 | 67 |
| Compression Set (70 Hrs. at 300°F.) | | | | | | |
| Press Cured | 81 | 66 | 79 | 61 | 44 | — |
| Post Cured | 38 | 19 | 27 | 24 | 29 | — |

[a] same polymer as in Example 1
[b] 99% ethyl acrylate, 1% methacrylic acid

EXAMPLE IV

A polymer containing both carboxyl groups and groups capable of being hydrolyzed to carboxyl groups was cured using the improved cure systems. The weight percent composition of the polymer (Rubber D) is about 62% butadiene, about 32% acrylonitrile, and about 6% methacrylic acid. The following recipes were used.

|  | 1 | 2 | 3 | 4 |
|---|---|---|---|---|
| Rubber D | 100 | 100 | 100 | 100 |
| N550 Black | 40 | 40 | 40 | 40 |
| Potassium Stearate | 3 | 3 | 3 | 3 |
| bis(chloromethyl) benzene | 1.7 | 1.7 | 1.7 | 1.7 |
| Dicyandiamide | 1 | — | — | — |
| Dodecyl pyridinium bromide" | — | 1.1 | — | — |
| Triethylenediamine | — | — | 0.7 | — |
| Tetramethyl guanidine/ toluene diisocyanate adduct | — | — | — | 1 |
| Cured 20 Min. at 350°F. |  |  |  |  |
| 100% Modulus, psi | 240 | 180 | — | 240 |
| Tensile, psi | 1850 | 1850 | 2250 | 2300 |
| Elongation, percent | 375 | 520 | 510 | 490 |
| Hardness, Duro. A | 63 | 60 | 63 | 60 |
| Compression set, percent (70 hrs. at 257°F.) | 79 | 97 | 68 | 74 |

"50% by weight on precipitated silica

EXAMPLE V

To aid in evaluating a broad range of cure system ingredients, a screening procedure was developed. The procedure uses a liquid carboxyl-containing polymer which has all of the features of the solid polymers; i.e. the same carboxyl-containing monomers and similar copolymerizable vinylidene monomers. The low molecular weight liquid polymer can be prepared using standard polymerization recipes but employing high levels of a polymerization chain modifier.

The screening procedure comprises mixing the liquid carboxyl-containing polymer with a dihalide compound, the nitrogen containing compound (in this case a quaternary ammonium salt), and an acid acceptor, placing the mixture into a large test tube, placing the filled test tube into a 150°C. oil bath, putting a stainless steel spatula into the mixture in the test tube, said spatula being turned in place, and measuring in minutes the time until the mixture gels. A shorter gel time indicates faster cure. Good correlation between cure of the liquid polymer in the screening procedure and cure of a solid polymer in a press-cure, is obtained.

The liquid polymer used for the screening procedure consists of interpolymerized units of 48.5% by weight of n-butyl acrylate, 48.5% by weight of ethyl acrylate, and 3% by weight of methacrylic acid. The polymer viscosity (bulk viscosity) is 546,000 centipoises measured at 53°C. using a Brookfield LVT Viscometer at 0.6 rpm with Spindle No. 4. The results of the tests are given in the following table. Cure system ingredients are given in parts by weight per 100 parts by weight of polymer.

| Sample | Dihalide Compound | Parts | N-Containing Compound | Parts | Acid Acceptor | Parts | Gel Time (Min.) |
|---|---|---|---|---|---|---|---|
| 1 | 3,6-bis(chloromethyl)-1,2,4,5-tetramethyl benzene | 3.0 | Benzyl trimethyl ammonium dodecylbenzene sulfonate | 1.0 | Barium Salt of Naphthenic Acid | 6.0 | 10 |
| 2 | 3,6-bis(chloromethyl)-1,2,4,5-tetramethyl benzene | 3.0 | Benzyl trimethyl ammonium dodecylbenzene sulfonate | 2.0 | Barium Salt of Naphthenic Acid | 6.0 | 8.2 |
| 3 | 3,6-bis(chloromethyl)-1,2,4,5-tetramethyl benzene | 2.0 | Benzyl trimethyl ammonium dodecylbenzene sulfonate | 1.0 | Barium Salt of Naphthenic Acid | 4.0 | 13.5 |
| 4 | 3,6-bis(chloromethyl)-1,2,4,5-tetramethyl benzene | 3.0 | Trimethyl soya ammonium neodecanoate | 2.0 | Sodium Stearate | 6.0 | 4.5 |
| 5 | 3,6-bis(chloromethyl)-1,2,4,5-tetramethyl benzene | 3.0 | Trimethyl soya ammonium neodecanoate | 1.0 | Barium Salt of Naphthenic Acid | 6.0 | 5.7 |
| 6 | 3,6-bis(chloromethyl)-1,2,4,5-tetramethyl benzene | 3.0 | Trimethyl soya ammonium neodecanoate | 2.0 | Sodium Stearate | 4.0 | 6.2 |
| 7 | 3,6-bis(chloromethyl)-1,2,4,5-tetramethyl benzene | 2.0 | Trimethyl soya ammonium neodecanoate | 2.0 | Sodium Stearate | 5.0 | 5.7 |
| 8 | 3,6-bis(chloromethyl)-1,2,4,5-tetramethyl benzene | 3.0 | Trimethyl soya ammonium paratoluene sulfonate | 2.0 | Sodium Stearate | 6.0 | 7 |
| 9 | 3,6-bis(chloromethyl)-1,2,4,5-tetramethyl benzene | 3.0 | Trimethyl soya ammonium paratoluene sulfonate | 2.0 | Sodium Stearate | 6.0 | 7.2 |
| 10 | 3,6-bis(chloromethyl)-1,2,4,5-tetramethyl benzene | 3.0 | Tetraethyl ammonium paratoluene sulfonate | 1.3 | Sodium Stearate | 6.0 | 8 |
| 11 | 3,6-bis(chloromethyl)- | 5.0 | Trimethyl soya ammonium | 1.0 | Barium Salt of | 6.0 | 5.0 |

| Sample | Dihalide Compound | Parts | N-Containing Compound | Parts | Acid Acceptor | Parts | Gel Time (Min.) |
|---|---|---|---|---|---|---|---|
|  | 1,2,4,5-tetramethyl benzene | | chloride | | Naphthenic Acid | | |
| 12 | 3,6-bis(chloromethyl)-1,2,4,5-tetramethyl benzene | 5.0 | Trimethyl soya ammonium chloride | 1.0 | Barium Oxide | 5.0 | 36.2 |
| 13 | 3,6-bis(chloromethyl)-1,2,4,5-tetramethyl benzene | 2.0 | Trimethyl soya ammonium chloride | 1.0 | Sodium Stearate | 6.0 | 7.7 |
| 14 | 3,6-bis(chloromethyl)-1,2,4,5-tetramethyl benzene | 3.0 | Trimethyl soya ammonium chloride | 1.0 | Sodium Stearate | 6.0 | 6.0 |
| 15 | 3,6-bis(chloromethyl)-1,2,4,5-tetramethyl benzene | 5.0 | Trimethyl soya ammonium chloride | 1.0 | Sodium Stearate | 6.0 | 150 |
| 16 | 3,6-bis(chloromethyl)-1,2,4,5-tetramethyl benzene | 3.0 | Trimethyl soya ammonium chloride | 1.0 | Sodium Cinnamate | 3.0 | 130 |
| 17 | 3,6-bis(chloromethyl)-1,2,4,5-tetramethyl benzene | 2.0 | Trimethyl soya ammonium chloride | 1.0 | Sodium Cinnamate | 3.0 | 15 |
| 18 | 3,6-bis(chloromethyl)-1,2,4,5-tetramethyl benzene | 3.0 | Benzyl trimethyl ammonium dodecyl benzene sulfonate | 2.0 | Barium Salt of Naphthenic Acid | 6.0 | 10 |
| 19 | 3,6-bis(chloromethyl)-1,2,4,5-tetramethyl benzene | 2.0 | Benzyl trimethyl ammonium dodecyl benzene sulfonate | 1.0 | Barium Salt of Naphthenic Acid | 4.0 | 13.5 |
| 20 | 3,6-bis(chloromethyl)-1,2,4,5-tetramethyl benzene | 3.0 | Trimethyl soya ammonium dodecylbenzene sulfonate | 2.0 | Sodium Stearate | 6.0 | 11 |
| 21 | 3,6-bis(chloromethyl)-1,2,4,5-tetramethyl benzene | 2.0 | Trimethyl soya ammonium stearate | 1.0 | Sodium Stearate | 6.0 | 11 |
| 22 | 3,6-bis(chloromethyl)-1,2,4,5-tetramethyl benzene | 2.0 | Trimethyl soya ammonium stearate | 2.0 | Sodium Stearate | 5.0 | 8 |
| 23 | 3,6-bis(chloromethyl)-1,2,4,5-tetramethyl benzene | 3.0 | Trimethyl soya ammonium stearate | 1.0 | Sodium Stearate | 6.0 | 8 |
| 24 | 1-bromo-2-chloropropane | 3.0 | Trimethyl soya ammonium | 2.0 | Sodium Stearate | 6.0 | 27 |
| 25 | bis(β-chloroethyl) dodecyl succinate | 6.0 | Trimethyl soya ammonium neodecanoate | 3.0 | Sodium Neodecanoate | 6.0 | 80 |
| 26 | β,β'-dichloroethyl ether | 5.0 | Trimethyl soya ammonium neodecanoate | 1.0 | Barium Salt of Naphthenic Acid | 6.0 | 116 |
| 27 | β,β'-dichloroethyl ether | 5.0 | Benzyl trimethyl ammonium dodecylbenzene sulfonate | 2.0 | Barium Salt of Naphthenic Acid | 6.0 | 180 |
| 28 | bis(chloromethyl)benzene | 2.0 | Trimethyl soya ammonium chloride | 1.0 | Sodium cinnamate | 3.0 | 40 |

I claim:

1. A vulcanizable composition comprising (1) a carboxyl-containing polymer having a weight percent carboxyl content of from about 0.05% to about 63% by weight based on the weight of the polymer and consisting of interpolymerized units of from about 0.1 percent to 100 percent by weight of a carboxyl-containing monomer and up to 99.9 percent by weight of an acrylate monomer(s) of the formula

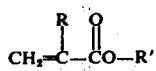

wherein R is H, —CH$_3$, or —C$_2$H$_5$, and R' is selected from the group consisting of an alkyl radical containing 1 to about 24 carbon atoms and an alkoxyalkyl radical containing a total of 2 to about 12 carbon atoms in the radical, and (2) as the only curatives a cure system consisting essentially of (a) from about 0.1 part to about 10 parts by weight of a di- or poly-functional halide compound containing 2 to about 40 carbon atoms in the molecule and having at least two primary carbon halide groups, (b) from about 0.1 part to about 10 parts by weight of a nitrogen-containing compound selected from the group consisting of (i) a quaternary ammonium salt, (ii) a mono-, di- or polyfunctional tertiary amine or a monofunctional secondary amine, and (iii) a guanidine, and (c) from about 0.1 part to about 15 parts by weight of an acid acceptor selected from the group consisting of (i) metal salts of organic acids and (ii) non-alkali metal oxides and hydroxides, said parts by weight of the cure system based upon 100 parts by weight of the carboxyl-containing polymer.

2. A composition of claim 1 where in the acrylate monomer R' is an alkyl radical containing 1 to about 18 carbon atoms or an alkoxyalkyl radical containing 3 to about 8 carbon atoms.

3. A composition of claim 2 wherein the carboxyl-containing polymer is an interpolymer of ethyl acrylate and methacrylic acid.

4. A composition of claim 2 wherein the halide compound has the structure

wherein X is Cl, Br, or I, n is 2 to about 6, and A is nothing or is selected from the group consisting of an alkylene radical of 1 to about 24 carbon atoms, a bivalent aryl radical containing 6 to about 14 carbon atoms, and a bivalent ether, ketonic, and ester radical containing 2 to about 24 carbon atoms total in the radical.

5. A composition of claim 4 wherein the halide compound is an alkylene dihalide.

6. A composition of claim 4 wherein the halide compound is a dihalide dialkarylene.

7. A composition of claim 4 wherein the halide compound is a dihaloether.

8. A composition of claim 4 wherein the nitrogen-containing compound is a quaternary ammonium salt of the structure

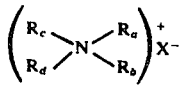

wherein $R_a$, $R_b$, $R_c$ and $R_d$ are hydrocarbon radicals containing 1 to about 18 carbon atoms selected from the group consisting of alkyl, aryl, alkaryl, and aralkyl radicals, or wherein two or three of the $R_a$, $R_b$, $R_c$ or $R_d$ radicals form with the nitrogen atom a heterocyclic structure containing 3 to 8 atoms selected from the group consisting of C, N, O and S, where at least two atoms are C, and X is an anion selected from the group consisting of $Cl^-$, $Br^-$, $I^-$, $NO_3^-$, $HSO_4^-$, $NaSO_4^-$, $H_2PO_4^-$, $NaHPO_4^-$, $RCOO^-$, $RSO^{3-}$, $H_2BO_3^-$, and $ROPO_3H^-$, where R is a radical containing 1 to 18 carbon atoms selected from the group consisting of alkyl, alkaryl, and aliphatic radicals or is an alkylphenoxy poly(ethyleneoxy)ethyl radical.

9. A composition of claim 8 wherein the quaternary ammonium salt is selected from the group consisting of trimethyl soya ammonium chloride, trimethyl soya ammonium neodecanoate, trimethyl soya ammonium paratoluene sulfonate, trimethyl soya ammonium stearate, benzyl trimethyl ammonium stearate, benzyl trimethyl ammonium dodecylbenzene sulfonate, and dodecyl pyridinium bromide.

10. A composition of claim 4 wherein the nitrogen-containing compound is a monofunctional tertiary amine selected from the group consisting of cyclic methyleneamines and heterocyclic amines containing 4 to 8 atoms in the ring and tertiary amines containing 1 to about 18 carbon atoms in the aliphatic groups where at least one group is methyl or ethyl.

11. A composition of claim 10 wherein the monofunctional tertiary amine is employed in the form of an aminimide as a tertiary amine precursor.

12. A composition of claim 4 wherein the nitrogen-containing compound is a monofunctional secondary aliphatic amine, cyclic methyleneamine, or heterocyclic amine.

13. A composition of claim 4 wherein the nitrogen-containing compound is a guanidine.

14. A composition of claim 4 wherein the acid acceptor is an alkali or non-alkali metal salt of a monocarboxylic acid or an alkali metal salt of an organophosphoric acid.

15. A composition of claim 14 wherein the acid acceptor is an alkali or non-alkali metal acid of a monocarboxylic saturated alkyl or aromatic acid containing 6 to 20 carbon atoms in the molecule.

16. A composition of claim 4 wherein the acid acceptor is an oxide or hydroxide of barium, lead, calcium, or magnesium.

17. A composition of claim 8 wherein the dihalide compound is 1,4-bis(chloromethyl)-2,3,5,6-tetramethylbenzene, the nitrogen-containing compound is trimethyl soya ammonium paratoluene sulfonate, and the acid acceptor is sodium stearate.

18. A composition of claim 7 wherein the carboxyl-containing polymer is comprised of interpolymerized units of ethyl acrylate and methacrylic acid and the cure system consists essentially of potassium or sodium stearate, bis(trimethylamine) sebacimide, and bis(Δ-chlorobutyl)ether or bis(chloromethyl)diphenyl ether.

19. A composition of claim 9 wherein the carboxyl-containing polymer is comprised of interpolymerized units of ethyl acrylate, n-butyl acrylate, and methacrylic acid and the cure system consists essentially of sodium or potassium stearate, 1,4-bis(chloromethyl)-2,3,5,6-tetramethyl benzene, and trimethyl soya ammonium p-toluene sulfonate.

20. A composition of claim 9 wherein the carboxyl-containing polymer is comprised of interpolymerized units of ethyl acrylate and methacrylic acid and the cure system consists essentially of sodium or potassium stearate, 1,4-bis(chloromethyl)-2,3,5,6-tetramethyl benzene, and trimethyl soya ammonium neodecanoate.

21. A composition of claim 9 wherein the carboxyl-containing polymer is comprised of interpolymerized units of ethyl acrylate and methacrylic acid and the cure system consists essentially of sodium or potassium stearate, benzyl trimethyl ammonium stearate, and 1,2-bis(chloroethoxy) ethane.

22. A composition of claim 16 wherein the carboxyl-containing polymer is comprised of interpolymerized units of ethyl acrylate and methacrylic acid and the cure system consists essentially of barium oxide, 1,4-bis(chloromethyl)-2,3,5,6-tetramethyl benzene, and bis(trimethylamine) sebacimide.

23. A composition of claim 15 wherein the carboxyl-containing polymer is comprised of interpolymerized units of ethyl acrylate, n-butyl acrylate and methacrylic acid and the cure system consists essentially of sodium or potassium stearate, 1,4-bis(chloromethyl)-2,3,5,6-tetramethyl benzene, and the phosphoric acid salt of trimethyl amine.

* * * * *

UNITED STATES PATENT OFFICE
CERTIFICATE OF CORRECTION

PATENT NO. : 3,976,627
DATED : August 24, 1976
INVENTOR(S) : Roger E. Morris

It is certified that error appears in the above-identified patent and that said Letters Patent are hereby corrected as shown below:

Column 17, in Claim 10, at line 37, after the word tertiary, add the word --aliphatic--.

Column 18, in Claim 15, at line 2, after the word metal, delete the word "acid" and add the word --salt--.

Signed and Sealed this

Tenth Day of January 1978

[SEAL]

Attest:

RUTH C. MASON
Attesting Officer

LUTRELLE F. PARKER
Acting Commissioner of Patents and Trademark